(12) United States Patent
Vegh et al.

(10) Patent No.: US 9,493,313 B2
(45) Date of Patent: *Nov. 15, 2016

(54) DYNAMIC DISCHARGE COMPENSATION FOR A SORTATION SYSTEM

(71) Applicant: Intelligrated Headquarters, LLC, Mason, OH (US)

(72) Inventors: Mark Kenneth Vegh, Frederick, MD (US); Jeffrey A. Rosenwald, Frederick, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/646,624

(22) PCT Filed: Nov. 21, 2013

(86) PCT No.: PCT/US2013/071313
§ 371 (c)(1),
(2) Date: May 21, 2015

(87) PCT Pub. No.: WO2014/081965
PCT Pub. Date: May 30, 2014

(65) Prior Publication Data
US 2015/0314964 A1    Nov. 5, 2015

Related U.S. Application Data

(60) Provisional application No. 61/729,302, filed on Nov. 21, 2012.

(51) Int. Cl.
| | | |
|---|---|---|
| B65G 43/08 | (2006.01) | |
| B65G 47/34 | (2006.01) | |
| B65G 47/46 | (2006.01) | |
| B65G 47/96 | (2006.01) | |
| G05B 19/418 | (2006.01) | |
| G05B 19/05 | (2006.01) | |

(52) U.S. Cl.
CPC .......... *B65G 43/08* (2013.01); *B65G 47/34* (2013.01); *B65G 47/96* (2013.01); *G05B 19/4189* (2013.01); *G05B 19/056* (2013.01); *G05B 2219/40078* (2013.01); *Y02P 90/28* (2015.11)

(58) Field of Classification Search
CPC .......... G06F 7/00; B65G 47/96; B65G 47/34; B65G 35/00; B65G 47/46; B65G 43/08; B65G 47/49; B65G 47/50; B65G 47/52; B65G 1/04; G05B 19/418; B07C 3/06; B07C 5/36
See application file for complete search history.

(56) References Cited

U.S. PATENT DOCUMENTS

| | | | |
|---|---|---|---|
| 5,433,311 A | 7/1995 | Bonnet | |
| 5,588,520 A | 12/1996 | Affaticati et al. | |
| 5,901,830 A | 5/1999 | Kalm et al. | |
| 6,253,901 B1 | 7/2001 | Hintz et al. | |

(Continued)

FOREIGN PATENT DOCUMENTS

| | | |
|---|---|---|
| JP | 05043039 A | 2/1993 |
| JP | 07267331 | 10/1995 |
| JP | 2010265077 | 11/2010 |

*Primary Examiner* — Mark A Deuble

(57) ABSTRACT

The discharge accuracy of unit sortation is improved by making real time adjustments to the discharge timing of the carrier based on the determined actual position of each article on respective carriers. The adjustments are applied at the time the discharge command is given.

24 Claims, 14 Drawing Sheets

(56) References Cited

U.S. PATENT DOCUMENTS

| | | | |
|---|---|---|---|
| 6,253,904 B1 | 7/2001 | Soldavini | |
| 6,478,138 B1* | 11/2002 | Edwards | B65G 17/345 |
| | | | 198/370.06 |
| 6,585,101 B2 | 7/2003 | Edwards et al. | |
| 6,820,561 B2* | 11/2004 | Soldavini | B65G 17/345 |
| | | | 104/88.03 |
| 7,121,398 B2* | 10/2006 | Affaticati | B07C 5/36 |
| | | | 198/357 |
| 7,721,964 B2* | 5/2010 | Reichenbach | B07C 3/14 |
| | | | 235/454 |
| 9,150,362 B2* | 10/2015 | Vegh | B65G 43/08 |
| 2009/0095600 A1* | 4/2009 | Reichenbach | B07C 3/14 |
| | | | 198/810.01 |
| 2010/0012464 A1* | 1/2010 | Schiesser | B65G 43/08 |
| | | | 198/460.1 |

* cited by examiner

DYNAMIC DISCHARGE COMPENSATION FOR A SORTATION SYSTEM

RELATED APPLICATIONS

The present application claims the benefit of priority to U.S. Provisional Application No. 61/729,302, entitled "DYNAMIC DISCHARGE COMPENSATION FOR A SORTATION SYSTEM" filed Nov. 21, 2012, the entire contents of which are hereby incorporated by reference in its entirety.

BACKGROUND

The present disclosure relates generally to an improvement in the precision and accuracy of sortation in material handling systems, and is particularly directed to an apparatus and method that consistently and reliably delivers articles to the desired discharge location at the desired time. The innovation will be specifically disclosed in connection with a unit sortation system which includes a crossbelt carrier.

Goals of sortation systems are accuracy and the maximization of throughput of articles. While increasing conveyance speed will increase throughput, the difficulty, and therefore the importance, of maintaining accuracy increases as the speed of conveyance increases.

While there are many aspects of accuracy, it ultimately comes down to overall system accuracy—getting each article to its intended discharge location. Sortation accuracy directly affects the overall system accuracy: inaccuracies are manifested by articles that are discharged to the wrong location (e.g., misdirected articles), jams, and by non-discharged product. In order to discharge articles to an intended location, the articles must be delivered to a designated discharge location at a specified time, and within acceptable tolerance ranges. As speed of conveyance increases the acceptable tolerance ranges decreases.

There are many systems and conditions upstream of the point of induction that directly influence sortation accuracy. In addition, the precision and accuracy of the systems between the point of induction and the discharge location have a substantial influence on the overall system accuracy and throughput. The present innovation may be used in a unit sortation system, such as crossbelt and tilt tray sorter, and more particularly is disclosed in connection with a crossbelt sortation subsystem system. Unit sorters are also known as loop sorters.

The location of an article on a carrier of a unit sortation conveyor is directly related to the ability to accurately deliver the article to its intended discharge location. Prior art solutions for crossbelt sorters have included the requirement to take a positive corrective action in order to reposition the article on the carrier laterally so as to relocate the article to the carrier's lateral center prior to instructing the carrier to discharge. This one dimensional adjustment becomes less effective as carrier width and carrier speed increases, and is not adequate to produce the desired accurate and precise discharge of articles. Such a solution is disadvantageous since it requires a wider discharge chute, consuming valuable floor space proximate to the sortation machine, thereby reducing the number of available discharge locations.

The present innovation results in articles being delivered through a selected point in space on a discharge trajectory, resulting, in the embodiment disclosed, in the article's own inertia in combination with gravity carrying that article to a selected destination.

Although an embodiment described herein comprises a crossbelt unit sortation conveyor system, it will be understood that the present innovation is not limited in use or application thereto.

BRIEF DESCRIPTION OF THE DRAWINGS

The accompanying drawings illustrate embodiments, and, together with specification, including the detailed description which follows, serve to explain the principles of the present innovation.

DETAILED DESCRIPTION

Figure 1:
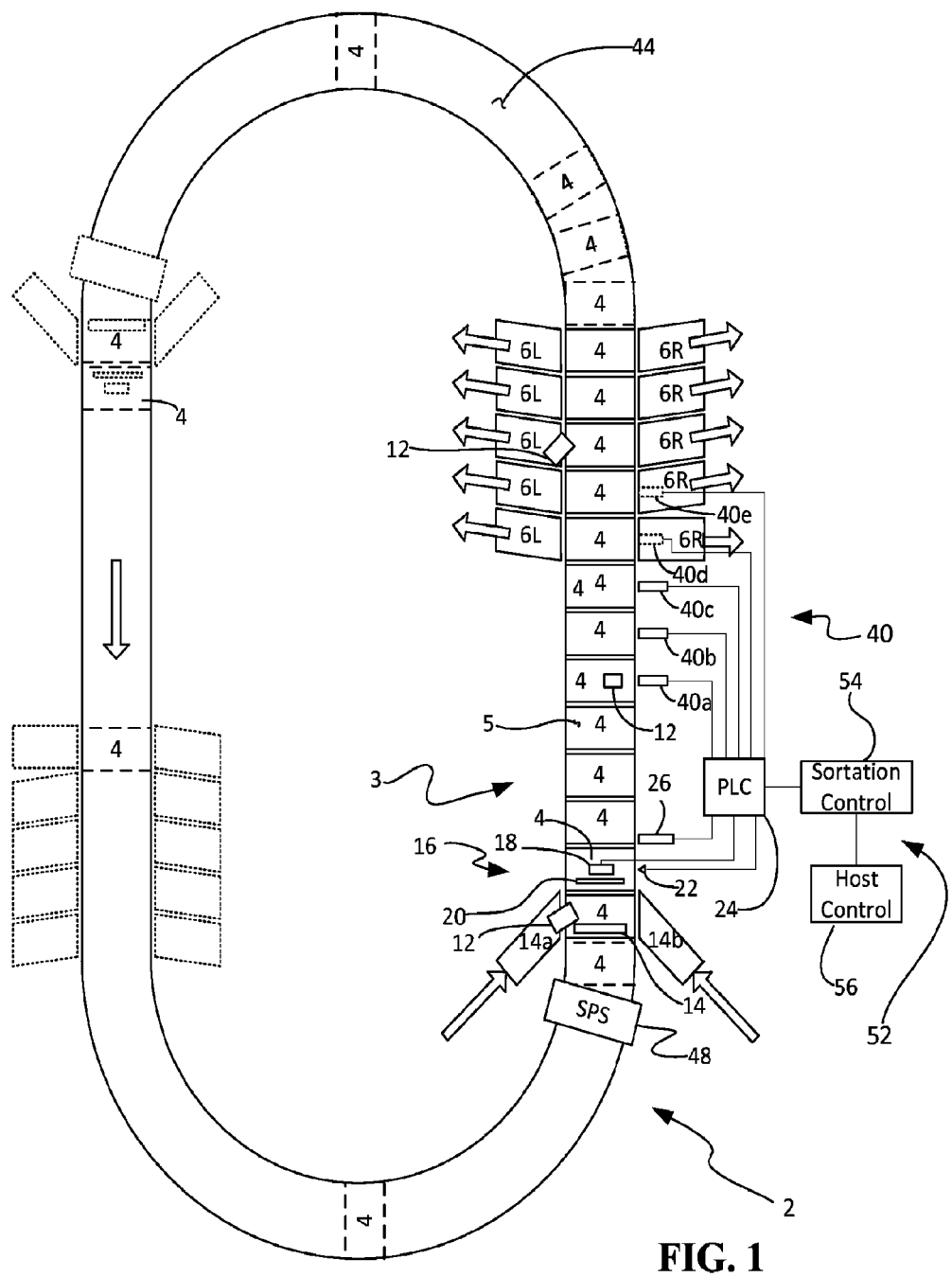
FIG. 1 is a diagrammatic representation of a section of a unit sortation conveyor system.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Referring to FIG. 1, sortation system, generally indicated at 2, is a unit sortation conveyor subsystem that can sort articles 12 received from a material handling system. Sortation system 2 can be connected to a host control 56 of the material handling system. The sortation system 2 is diagrammatically represented in FIG. 1 as an oval 44, having an endless conveyor 3 moving at a constant speed in a direction such as counterclockwise as indicated by the direction of travel arrows on the oval. Moving conveyor 3 is flanked by a plurality of discharge locations 6L, 6R that are stationary thereto, and can include discharge locations 6L, 6R at more than one side of the oval 44. The endless conveyor 3 can comprise a plurality of carriers 4 linked together with a conveying surface 5 on each carrier 4 for conveying an article 12 placed thereon. Each moving carrier 4 can receive article 12 from an induction, and each can discharge the article 12 into a selected one of the stationary lateral discharge locations 6L, 6R at a specified time. After induction, the location of the article can be anywhere on the conveying surface 5 and this imprecision can affect discharge accuracy. To deliver the article 12 to the selected one of discharge locations 6L, 6R with a high degree of accuracy, the present innovation can take a snapshot of the article 12 on the moving conveying surface 5, can use the snapshot information to calculate a compensating time-to-intercept point on a pre-calculated article discharge trajectory, and can, at the appropriate time, initiate one movement of the conveying surface 5 to discharge the article 12 from any position on the conveying surface 5 onto a trajectory that places the article 12 into the selected one of discharge locations 6L, 6R.

System Overview

To accomplish this, the present innovation can: scan the article 12 on the conveying surface 5 with an item detection system 16, process the scan information to define the location of the article 12 on the conveying surface 5, deliver the location information to the moving the carrier 4 carrying the scanned article 12, and provide the carrier 4 with a discharge direction that will place the article 12 into a selected one of the discharge locations 6L, 6R. To ensure that the article 12 arrives into the selected one of the discharge locations 6L, 6R, the present innovation can also calculate a compensating time-to-intercept point (or release point) to place the article 12 on a discharge trajectory based on: the location information of the article 12 on the conveying surface, the direction of article discharge, the longitudinal speed of the endless conveyor 3, and lateral speed of the conveying surface 5. At the appropriate time (interception point), the present innovation can initiate one discharge movement of the conveying surface 5 to discharge the article 12 into the selected one of discharge locations 6L, 6R.

In the exemplary embodiment depicted, the sortation system 2 is described as an endless conveyor 3 of carriers 4 such as crossbelt sorters. The conveying surface 5 of each carrier 4 can comprise a conveyor belt 7 oriented to discharge articles 12 crosswise or at a right angle to the direction of travel. Each carrier 4 can include a carrier discharge control 28 located under the conveyor belt 7 that comprises a microprocessor and memory that can receive and store article positional information, can calculate the time-to-intercept point described above, and at the appropriate time, initiate the discharge of the article 12 along the discharge trajectory while the carrier 4 is moving. Carrier discharge control 28 can also comprise a motor control that actuates, on command, motors or other elements of the carrier 4 to discharge the article 12 therefrom. The present innovation is not limited to the embodiment depicted, and may be advantageously used with other unit sortation systems, such as by way of non-limiting example, a tilt tray sorter.

Figure 2:
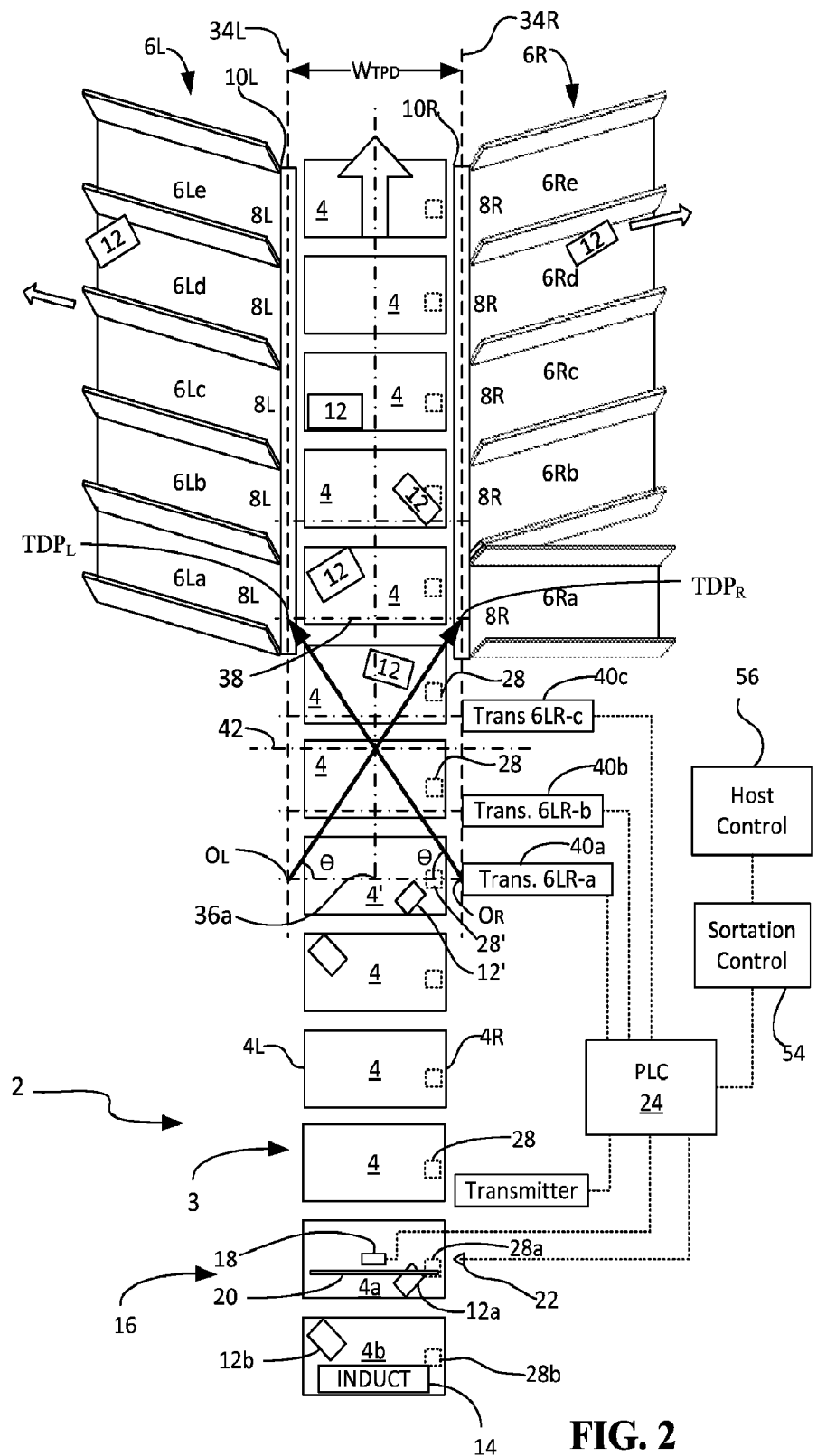
FIG. 2 illustrates discharge trajectories (right and left directions) which deliver respective articles to a desired point in space, overlaid on a portion of a crossbelt sortation conveyor system which is nearly an identical to the diagrammatic representation of FIG. 1.

As depicted in at least FIGS. 1 and 2, sortation system 2 receives articles 12 from the material handling system via the induction 14. As shown, induction 14 can induct articles onto endless conveyor 3 with any of an overhead merge, or an angle merges 14a, 14b. An item detection system 16 is located downstream from the induction 14 and can scan the carriers 4 passing underneath. The item detection system 16 can identify articles 12 on carriers 4 passing underneath, and as will be described below, can derive locational or positional information of the article 12 on the carrier. And, the item detection system 16 can detect a relative location of the article positioned off-center on a selected carrier of the sortation system 2 The positional information is sent to a PLC 24 which can include a microprocessor and memory to translate the article location information from the item detection system 16 into a form that the carrier 4 can use. The PLC 24 communicates the location information, as off-center values such as an X axis deviation and a Y axis deviation from a conveying surface reference point, to the carrier control 28 of the corresponding carrier 4 via transmitter 26. The carrier control 28 stores the information within until moving downstream to receiving a discharge direction command of "discharge left" or "discharge right" from transmitter 40 that directs the carrier 4 to place the article 12 into the selected one of the discharge locations 6L, 6R.

The discharge direction command is sent from the PLC 24 to the transmitter 40 and can be based at least in part on information from a sortation control 24 and a host control 56. The host control 56 can provide the PLC 24 with a map of which discharge location 6L, 6R that article 12 is to be discharged into after induction, and identification of the article on the sorter 2. Article weight, article volume, and article shape can be taken into consideration. For example, the host control 56 can provide information on whether the article shape is a sphere or a rectangular box, and can provide parameters or characteristics that can be used to modify the discharge compensation. For example, but not limited thereto, in the case of a sphere, the belt speed may be adjusted to prevent rolling of the article 12 as it is discharged from the carrier 4. A sortation control 54 provides unified operational control and alarm surveillance for the subsystems that make up the sorter 2. Sortation control 54 can make the article 12 routing decisions based on information provided by the host control 56. In the depicted embodiment, PLC 24 is utilized for most of the control of sortation system 2 since output results must be produced in response to input conditions within a limited time, otherwise unintended operation may result. Sortation conveyor system 2 includes processing system 52, which includes one or more processors, such as PLC 24 and sortation control 54, and can include memory or recordable media. To the extent, if any, that host control 56 is involved in control of sortation system 2, host control 56 may be considered part of processing system 52. In the depicted embodiment, PLC 24 is utilized for most of the control of sortation system 2 since output results must be produced in response to input conditions within a limited time, otherwise unintended operation may result.

The PLC 24 can transmit the discharge trajectories 30L, 30R to the carrier discharge control 28 of the carrier 4 with a transmitter 26 located downstream from the item detection system 16. The PLC 24 waits until the carrier 4 approaches a transmitter 40 related to a discharge location 6L, 6R, and initiates the article discharge by transmitting a "discharge left" or a "discharge right" signal from transmitter 40 that is received by the carrier discharge control 28 with transmitter 40. After receiving the discharge direction command, the carrier discharge control 28 begins determining the steps necessary, at the appropriate time, to release or discharge the article 12 along the selected one of the discharge trajectories 30L, 30R to place the article 12 into the selected one of the discharge locations 6L, 6R. In response to reaching the release point, the processing system 52 can initiate the discharge of the article 12 by the selected carrier 4.

Discharge Locations

The plurality of stationary discharge locations 6L, 6R positioned downstream from the shown on both sides of the oval 44 of FIG. 1 with one set of opposing discharge locations shown as solid lines, and a second set of discharge locations shown as dashed lines. All discussions below will be about the solid line stationary discharge locations 6L, 6R shown in FIG. 1. Discharge locations 6L, 6R are disposed adjacent each other in rows extending from each side of sortation system 2. Discharge locations 6L, 6R can receive articles 12 from the endless conveyor 3 and can discharge the articles The pluralities of discharge locations 6L, 6R are also known as chute banks, but are not limited to chutes. Each discharge location 6L is shown aligned laterally with a discharge location 6R disposed on the opposite side of endless conveyor 3. Although sortation system 2 is depicted as a double sided sorter, one sided sorters and configurations without aligned left and right side discharge locations may be used. It is noted that the representations of the configuration of discharge locations 6L, 6R is not to be considered as limiting.

In at least FIGS. 1 and 2, the left side discharge locations 6L are diagrammatically illustrated as chutes or angled discharge locations designated as 6La-6Le having entrances 8L which are disposed generally at an angle relative to the longitudinal Y direction (the direction of travel arrow). The right side discharge locations 6R are diagrammatically illustrated as chutes or discharge locations designated as 6Ra-6Re having a combination of one straight discharge location 6Ra and four angled discharge locations 6Rb-6Re and entrances 8R. It is not unusual for the entrance characteristics of the discharge locations on each side to be the same.

FIG. 2 is an enlarged view of the right side of the sortation system 2 shown in FIG. 1. In the embodiment depicted in at least FIG. 2, sortation system 2 can include surfaces 10L flanking the disposed between discharge ends 4L of carriers 4, and entrances 8L of discharge locations 6L and surface 10R disposed between discharge ends 4R of carriers 4 and entrances 8R of discharge locations 6R. Surfaces 10L, 10R, can be a portion of the entrances 8R, 8L, or can be an interface surface which may be referred to as through-going-wood which serves as passive interfaces between carriers 4 and the discharge locations 6L, 6R. It is desirable that surfaces 10L, 10R present no significant impediment to the discharge of articles transitioning from carriers 4 (even if inaccurately discharged), and present a low coefficient of friction to the articles. Once on surfaces 10L, 10R, the articles are no longer receiving kinetic energy from sortation system 2, with the articles' trajectories being a function of gravity, the configuration of surfaces 10L, 10R, and the articles' own momenta. The resulting behavior is that the article 12 will tend to move away from the carrier 4 toward the discharge location 6L, 6R, along a predictable course of trajectory. Thus, the articles are controllably caused to travel along a nominal trajectory, having a high probably, with a low standard deviation, of reaching their intended destinations.

Article Induction

The material handling system (not shown) advances articles 12 to induct 14, which inducts articles 12 onto sortation system 2 at a point of induction, thereby associating each article 12 with at least one carrier 4. The point of induction is generally stationary relative to the moving carriers 4. In the embodiment depicted and discussed in more detail, one article 12 is associated with one carrier 4. As depicted in at least FIGS. 2-5, it is typical that articles 12 are not placed on the conveying surface 5 of carriers 4 in a consistent, repeatable location, but instead are located almost anywhere on the conveying surface 5 of carriers 4. Unlike many sortation systems, the sortation system 2 of the current innovation can carry the article in the "as placed" location until discharged on a discharge trajectory that places the article 12 into a selected one of the discharge locations 6L, 6R. To accomplish this, the location of the "placed" article 12 can be determined relative to the conveying surface 5.

The practice of this invention innovation may involve knowledge of the position of the article relative to the carrier 4. There are many ways to have such article position information. For example, the relative positions would be known if articles 12 are accurately placed on respective carriers 4 in known respective locations relative to the carrier 4, even though such known locations varies from carrier 4 to carrier 4.

Article position may be expressed in any suitable way, such as Cartesian coordinates and polar coordinates. For each article 12, at least one article reference point (109 in FIGS. 3-5) may be selected for use in indicating the location of that article 12. Examples of an article reference point include the article's centroid and center of mass (which could be determined dynamically or could be a defined attribute for a particular type of article which is maintained in a database).

Item Detection System

As shown in FIG. 2, item detection system 16, is located downstream from the induct 14 and above the endless conveyor 3, and can determine the location of the article 12a as lateral and longitudinal positions relative to the conveying surface 5a of the moving carrier 4a. In this embodiment, item detection system 16 includes camera 18, infrared light LED light array 20, photo eye 22, PLC 24 and transmitter 26. In the embodiment depicted, camera 18 may be mounted 40 inches above the top surface of carrier 4, offset slightly from the center of carrier 4, having a field of view of 56 inches (horizontal), a 3.5 mm lens and an infrared bandpass filter attached behind the lens. Camera 18 may be any suitable device and may be mounted in any suitable location. Light array 20 may be 1160 mm long IR linear array light mounted horizontally parallel to carrier 4, 40 inches above the center of carrier 4.

When an article 12 is inducted onto a moving carrier 4 and passes beneath the stationary item detection system 16, a scan or snapshot may be taken of the moving conveying surface 5 to determine the location of the article 12 on the conveying surface 5 of the carrier 4. Item detection system 16 can include a microprocessor and memory that can process the information received from a snapshot of the carrier 4 and the article 12 to determine the location of the article 12 relative to the carrier 4. The snapshot of the article 12 on the conveying surface 5 of the carrier 4 can be triggered by the passage of a leading edge of the carrier discharge control 28 in front of the photo eye 22. Although the detection of the edge of carrier discharge control 28 is described, any suitable event may be used to trigger the detection snapshot. Although the depicted embodiment illustrates one article 12 per carrier 4, a single article may be carried by more than one carrier 4, with the discharge operation of multiple carriers 4 being coordinated so as to discharge the associated article 12.

In FIG. 2, carrier 4a and article 12a are moving underneath the item detection system 16. Camera 18 is suspended above the conveyor surface 5a and has snapped a snapshot of the moving carrier 4a and article 2a.

Figure 3:
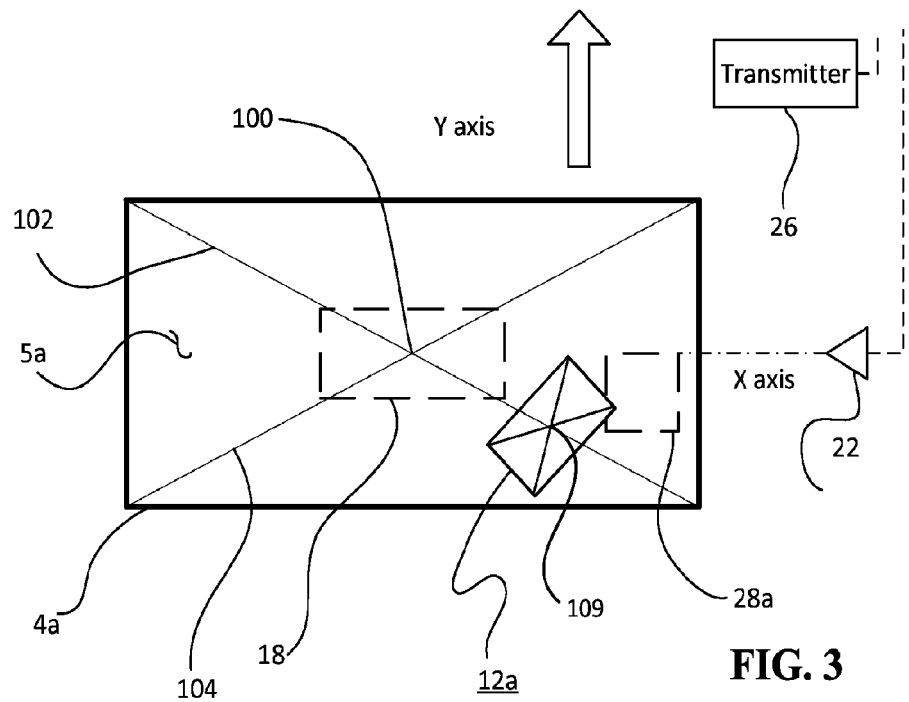
FIG. 3 is a diagrammatic representation of the reference system of a carrier.
Figure 4:
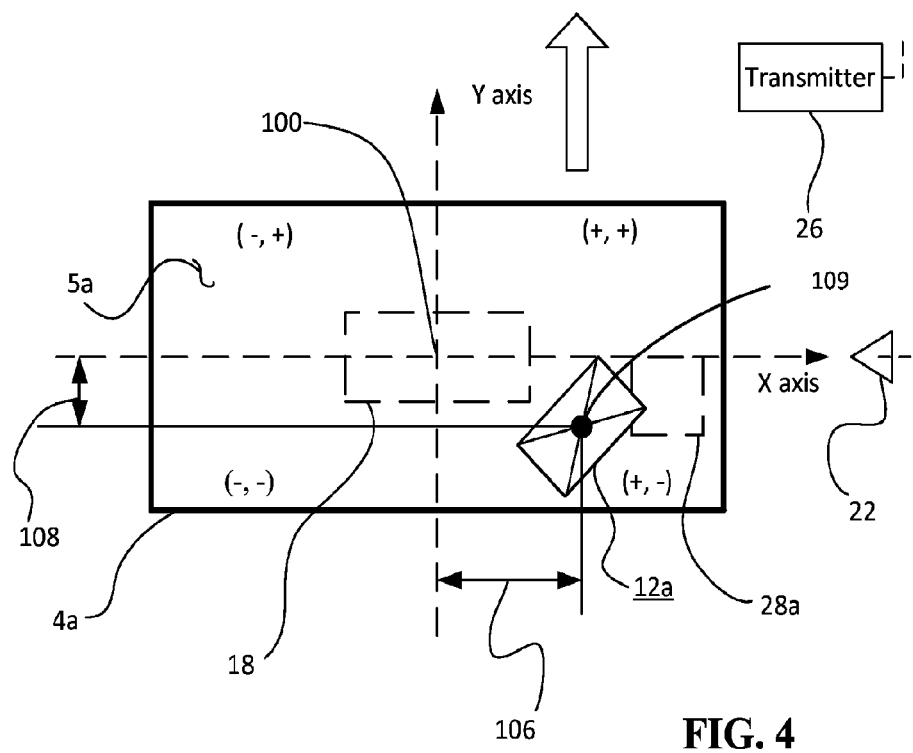
FIG. 4 illustrates an exemplary crossbelt carrier belt lateral velocity profile during discharge.
Figure 5:
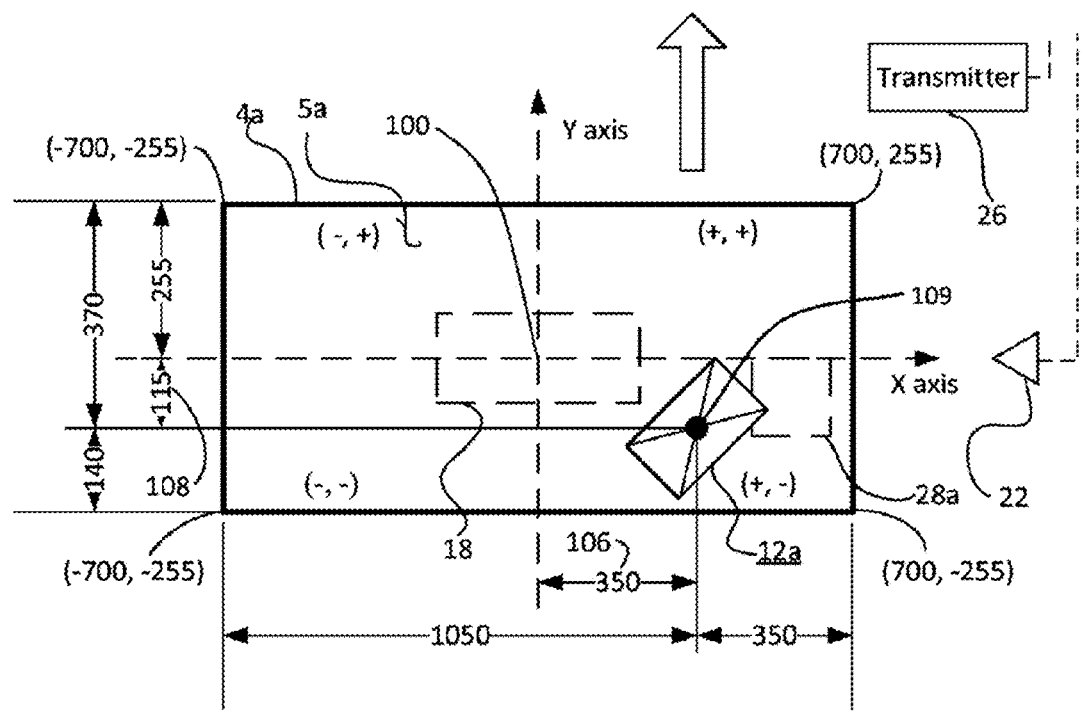
FIG. 5 is similar to FIG. 2 and illustrates discharge trajectories (right and left directions) of another embodiment.

FIGS. 3-5 are enlarged schematic views of the snapshot of the moving carrier 4a in the position shown in FIG. 2. As shown in the snapshot view of FIG. 3, the item detection system 16 may use the snapshot or scan information to identify the corners of the conveying surface 5a. Next, a first cross line 102 and a second cross line 104 can be drawn across the snapshot image. The intersection of cross lines 102, 104 identifies an origin 100 at the center of the conveying surface 5a which for this embodiment can be carrier reference point CRP. The item detection system 16 can also determine whether carrier 4a is occupied by article 12a. In the embodiment depicted, if article 12a is detected, item detection system 16 can use the previously described corner and cross line technique or edge detection to determine the center or centroid of article 12 (see FIG. 3) and uses the centroid as the reference point defining the article's position. Whereas a center of the conveying surface 5 is used as the origin, the present invention is not limited thereto and other locations can be used.

In FIG. 4, the item detection system 16 places a Cartesian coordinate system onto the origin 100 of the snapshot or scan with the X axis oriented in the lateral direction and the Y axis oriented in the direction of motion. In the embodiment depicted, item detection system 16 determines the centroid of article 12 and uses it as the article's article reference point 109 as an indicator of the article's position information. As shown in FIG. 5, the 1400 mm by 510 mm carrier 4 has the X axis range from 700 mm to −700 mm and the Y axis range from 255 mm to −255 mm. FIG. 3 indicates the signs of the X and Y coordinates in each of the four quadrants. Corners of the carrier 4 are located at (700, 255), (700, −255), (−700, −255) and (−700, 255). Article 12a is shown positioned in quadrant 4 a ΔX distance 106 from the X axis and origin 100, and a ΔY distance 108 from the Y axis and origin 100.

FIG. 5 shows numerical positional information that can be generated to locate the article 12a on the conveying surface 5 of carrier 4a. As shown, the positional data for the centroid of the article 12a is at (+350, −115) which defines an article reference point 109. The article reference point 109 of the example has a value of +350 mm for ΔX, and a value of −115 for ΔY. With the ΔX, ΔY location values for article 12a, discharging the article 12a to the left requires article 12a moves a distance of slightly more than 1050 mm. Discharging the article 12a to the right requires the article 12a to move to the right a distance of slightly more than 350 mm before the centroid of article 12a is discharged from the conveying surface 5a. This ΔX, ΔY article position information will be sent to the PLC 24 to compute the left and right trajectories 30L, 30R as well as the discharge compensations described below.

Calculating Cartesian Coordinate Discharge Compensations

Once the article position information is received, the PLC 24 calculates article discharge compensations $DA_X$, $DA_Y$ of the present innovation, as a time value based on the lateral deviation and the longitudinal deviation of the article reference point (109 in FIGS. 3-5) from the carrier reference point CRP, the nominal center of carrier 4 in the embodiment depicted. In the depicted embodiment as best shown in FIG. 2, the article discharge compensations $DA_X$, $DA_Y$ includes X direction article discharge compensation (lateral article discharge compensation) $DA_X$ based on the lateral position of the article's article reference point 109 and a Y direction article discharge compensation $DA_Y$ (longitudinal article discharge compensation) based on the longitudinal position of the article's article reference point 109, calculated according to the formulas $$DA_x = N(\Delta X / SS) + C \qquad (i)$$

$$= M(\Delta Y / CBS) + B \qquad (ii)$$

Where $DA_Y$ is the Y direction article discharge compensation (milliseconds)
$DA_X$ is the X direction article discharge compensation (milliseconds)
ΔY=Y displacement from carrier center (mm)
ΔX=X displacement from carrier center (mm)
CBS=cross belt sorter speed in X direction (when belt 7 is moving) (M/s)
SS=sorter speed in Y direction (sorter direction of travel) during operation (M/s)

Although the units indicated are metric, any suitable measurement system is applicable. Four adjustment parameters allow for iterative field tuning of the calculation on an empirical basis when commissioning the system:
M=Y axis scaling factor (nominal value 1.0)
N=X axis scaling factor (nominal value 1.0)
B=Y Offset factor (nominal value 0.0)
C=X Offset factor (nominal value 0.0)

For each article, the respective X direction article discharge compensation, $DA_X$, and the Y direction article discharge compensation, $DA_Y$, are communicated to the respective carrier discharge control 28 through transmitter 26, which is, in the present embodiment, an infrared transmitter, although any suitable transmitter and transmission method may be utilized. Alternatively, $DA_X$ and $DA_Y$ could be communicated to the carrier discharge control 28 by respective transmitters. As described previously, each carrier discharge control 28 stores the longitudinal and lateral article discharge compensations $DA_X$ and $DA_Y$ in the memory of carrier discharge control 28 until such time as carrier discharge control 28 receives a discharge command. $DA_X$ and $DA_Y$ may be updated if another item detection system is passed.

In the embodiment depicted, carrier discharge control 28 applies the article discharge compensations $DA_X$ and $DA_Y$ at the time discharge is initiated, which either advances or retards the time of discharge relative to a nominal or reference discharge compensation $D_R$ according to the adjustment and in accordance with the commanded direction of discharge. The reference discharge compensation $D_R$ represents the time required for the carrier reference point $CR_P$ (origin 100 in FIG. 5), to travel laterally from the discharge command location to the discharge trajectory (both discussed below). The article discharge compensation $DA_Y$ compensates for the position of the article relative to the carrier reference point $CR_P$.

The discharge command is the final communication act which causes the carrier discharge control to execute predetermined acts necessary to discharge an article, which, in this embodiment, is the movement of the carrier 4 through a programmed motion profile in the desired direction.

It is desirable that carriers 4 discharge the articles to the target discharge point $TDP_L$, $TDP_R$ at the velocity required for the articles to travel ultimately to the desired discharge location (e.g., a chute). Referring to FIG. 2, there are illustrated discharge trajectories 30L, 30R which deliver an article to a desired point in space, target discharge points $TDP_L$, $TDP_R$, overlaid on a portion of a crossbelt sortation system which is nearly an identical to the diagrammatic representation of FIG. 1. As can be seen, target discharge points $TDP_L$, $TDP_R$ are located beyond the respective discharge ends 4L, 4R of carriers 4, at a distance $W_{TPD}$ apart. Target discharge points $TDP_L$, $TDP_R$ may be located at any desired target point, so long as the article dynamics meet the requirements of the downstream system to which the articles are being transferred. Although termed a "point", a target discharge point may be multi-dimensional, such as but not limited to a two dimensional area. In the depicted embodiment, the downstream system includes surfaces 10L, 10R and discharge locations 6. In the depicted embodiment, $W_{TDP}$ is the total distance between target discharge points $TDP_L$ and $TDP_R$.

Discharge trajectories 30L, 30R are defined to represent the vector path along which each carrier 4 will drive an article's reference point such that the article reaches the target discharge point $TDP_L$, $TDP_R$ and thereafter travel to its desired discharge location, once a reference point on the article intercepts the line of trajectory. In the embodiment depicted, for analytical, computational purposes, discharge trajectories 30L, 30R are represented as vectors in a two-dimensional or X-Y reference system, it being recognized that such purposes can be achieved through many representational methods, including for example as vectors of a real reference system. For purposes of this explanation, a real reference frame is used to describe the discharge reference system, with the origin (0, 0) of the discharge reference system relative to chutes 6R and 6L (since chutes 6R and 6L align, one reference system may be used) is assigned to point 36a, the location of the lateral center of carrier 4' when carrier 4' receives a discharge command from carrier transmitter 40. In this depiction, the Y axis represents the movement of the carriers of the sortation conveyor in the longitudinal direction and the X axis represents lateral movement of an article on the carrier (which for a crossbelt carrier, corresponds to lateral movement of the upper conveying surface of the crossbelt). In the embodiment depicted, the magnitude of the crossbelt speed CBS is the same for both directions of discharge.

In the embodiment depicted, each discharge trajectory vector 30L, 30R, originates at a respective location, $O_L$, $O_R$, and terminates at the respective target discharge point, $TDP_L$, $TDP_R$. Lines 34L, 34R respectively pass through target discharge points $TDP_L$, $TDP_R$ parallel to the direction of travel, and are intersected by discharge trajectories 30R, 30L respectively at points $O_L$ and $O_R$, on line 36. Definitionally, the time required to for the carrier to be advanced laterally a length of $W_{TPD}$ at the crossbelt speed CBS is equal to the time required for the sorter to travel, at the sorter speed SS, the longitudinal distance between $O_L$, $O_R$ and $TDP_L$, $TDP_R$ (the distance between lines 36 and 38) is the same. Thus, the coordinates of the discharge trajectory origins are $$O_L(\tfrac{1}{2}W_{TDP}, 0) \qquad \text{(iii)}$$

$$O_R(-\tfrac{1}{2}W_{TDP}, 0) \qquad \text{(iv)}$$

The coordinates of $TDP_L$, $TDP_R$ are $$TDP_L(-\tfrac{1}{2}W_{TDP}, W_{TDP} \times SS/CBS) \qquad \text{(v)}$$

$$TDP_R(\tfrac{1}{2}W_{TDP}, W_{TDP} \times SS/CBS) \qquad \text{(vi)}$$

With the left and right target discharge points $TDP_L$, $TDP_R$ being spaced symmetrically from discharge ends 4L, 4R of carriers 4, discharge trajectories 30L, 30R intersect each other at a point 32 equidistant from discharge ends 4L, 4R, located at $(0, \tfrac{1}{2}W_{TDP} \times SS/CBS)$.

In FIG. 2, carrier 4' is illustrated as having advanced to the discharge command location at which, in the embodiment depicted, a discharge command is given to carrier discharge control 28' to initiate discharge of the article either to the right or left. The discharge command location is spaced upstream of the target discharge point a distance sufficient for the carrier to discharge the article to the discharge location associated with the discharge command location.

A nominal or reference discharge delay may be determined or established by the physical set up of the conveyor, representative of the time delay between when carrier 4' reaches the discharge command location and the carrier's reference point reaches a discharge trajectory, the location at which discharge actuation—actuating the carrier, (e.g., the crossbelt in the embodiment is driven by the motor)—occurs. In the embodiment depicted, the carrier reference point $CR_P$ is the carrier center point (origin of the X-Y reference frame). Since the center aligns with the intersection of the right discharge and left discharge trajectories, the nominal or reference discharge delay is the same for right discharge and left discharge. In the depicted embodiment, if the article centroid were located at the center of the carrier (0, 0) (the carrier reference point $CR_P$), the carrier discharge control 28 would delay discharge actuation until the carrier center (0,0) intercepted the trajectories at point 32, at which location discharge actuation would begin, actuating the carrier to discharge, which for the crossbelt carrier depicted, is actuation of the motor. Since point 32 is equidistance between line 36 and line 38, which passes through $TDP_L$ and $TDP_R$, the nominal or reference discharge delay time, $D_R$, is calculated by the equation:

$$D_R = \frac{1}{2} \frac{W_{TDP}(SS/CBS)}{SS} \qquad \text{(vii)}$$

which is equal to:

$$D_R = \tfrac{1}{2} W_{TDP}/CBS \qquad \text{(viii)}$$

which is the same amount of time required for the belt to travel half of the width of $W_{TDP}$.

Discharge is initiated when a discharge command is transmitted via the stationary carrier transmitter 40 to the carrier discharge control 28, which is carried by the carrier 4. Discharge comprises discharge compensation and discharge (carrier) actuation. For the embodiment depicted, discharge is initiated when carrier 4' has reached the appropriate location 36 as depicted in FIG. 2, whereat the discharge command is given. The discharge command also includes whether to discharge an article, indicated at A, left or right. Upon receipt of the discharge command, carrier discharge control 28' will apply the article discharge compensations (the X direction article discharge compensation $DA_X$ and the Y direction article discharge compensation $DA_Y$) which it previously stored to modify the reference discharge compensation $D_R$ to compensate for the actual position of article A on the carrier. The Y direction article discharge compensation $DA_Y$ is subtracted from the reference discharge compensation $D_R$ regardless of the direction, bearing in mind $DA_Y$ is positive for articles disposed forward of the carrier reference point and negative for articles disposed rear of the carrier reference point. The X direction article discharge compensation $DA_X$ is subtracted from the reference discharge compensation $D_R$ if the discharge is to the right and added to the reference discharge compensation $D_R$ if the discharge is to the left, bearing in mind that $DA_X$, in the embodiment depicted, is positive for articles disposed to the right of the carrier reference point CRp and negative for articles disposed to the left of the carrier reference point CRp.

$$\text{total discharge compensation (right discharge)} = D_R - DA_Y + DA_X \quad \text{(ix)}$$

$$\text{total discharge compensation (left discharge)} = D_R - DA_Y - DA_X \quad \text{(x)}$$

As can be seen the difference between right discharge and left discharge whether the X direction discharge compensation is added or subtracted.

Figure 7:
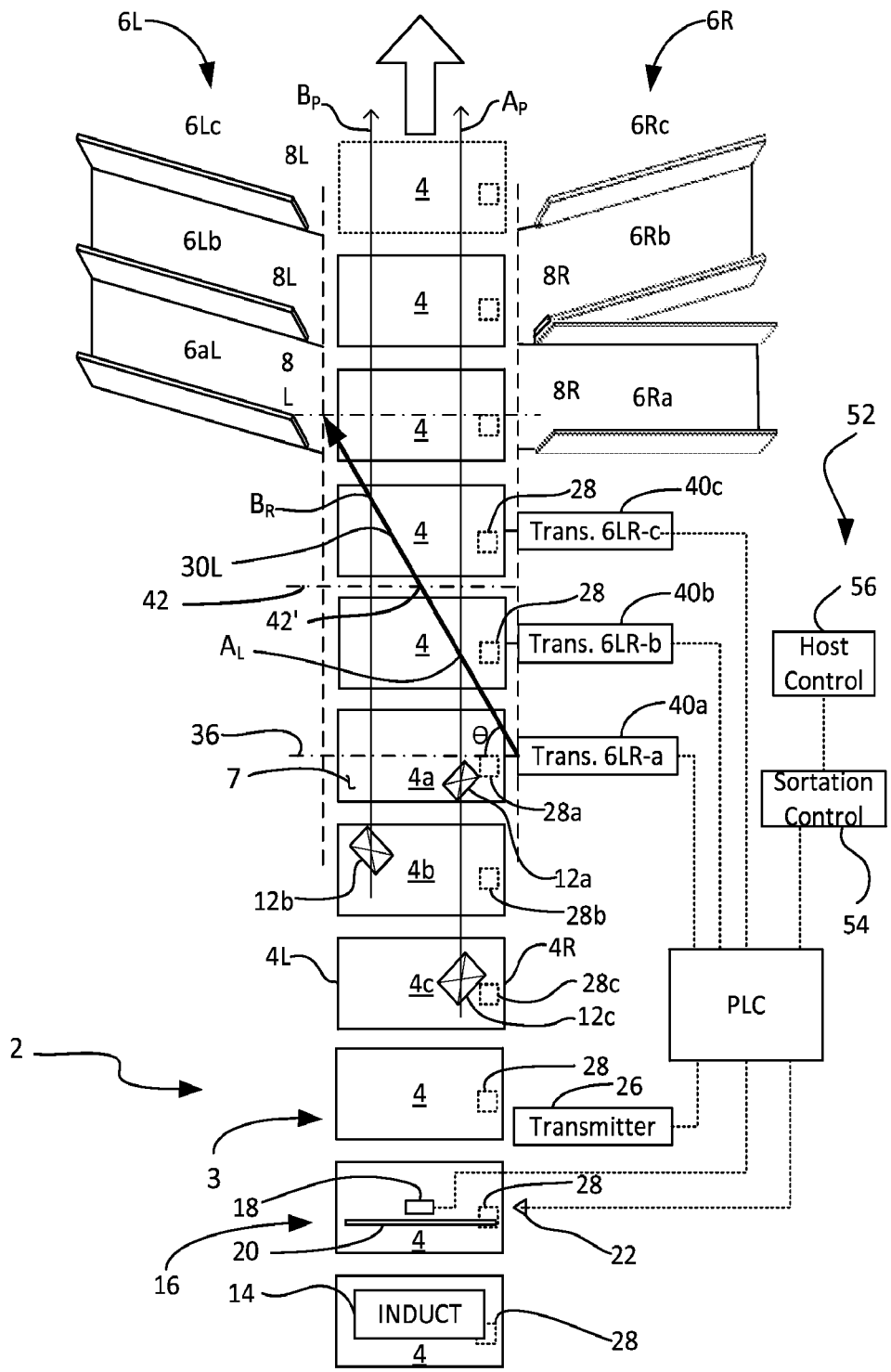
FIG. 7 is a diagrammatic representation of the unit sortation system of FIG. 6 with three articles ready for discharge from three carriers

By way of example, FIGS. 7-11 illustrate how three articles 12a, 12b, 12c are discharged from the endless conveyor 3 in three different trajectories that utilize the above described article discharge compensations $DA_x$, $DA_y$. Each of articles 12a, 12b, and 12c are being conveyed on carriers 4a, 4b, 4c respectively and in each consecutive Fig., the carriers 4 move downstream one carrier so that the movements of the of articles 12a-12 c along the discharge trajectories 30L, 30R can be shown. The article 12a is located laterally from the origin 100 in the position shown in FIGS. 2-5 and 7. In FIG. 7, the centers or centroids of articles 12a and 12c are in line laterally to the right of the origin 100 (FIG. 5) of carrier 4a and will travel along a first path $A_P$ in the direction of motion of the endless conveyor 3. Article 12b is following a second path $B_P$ that parallels path $A_P$.

In FIG. 7, the carrier discharge control 28a of carrier 4a is in line with transmitter 40a and has received a "discharge left" command from transmitter 40a discharge article 12a. Since the location of article 12A does not fall on the calculated trajectory 30L, the carrier discharge control 28a begins counting down until the article 12a follows first path $A_P$ and crosses the calculated trajectory 30L.

By way of example, in FIG. 7, article 12a will travel along path $A_P$. If article 12a is to be discharged left, carrier 4a needs to be actuated when article 12a reaches point $A_L$ on discharge trajectory 30L. The time required to reach this point is equal, the total discharge compensation, is determined by subtracting the Y direction discharge compensation $DA_Y$ from the reference discharge compensation $D_R$ and subtracting the X direction discharge compensation $DA_X$ from the reference discharge compensation $D_R$. Article 12b is traveling on carrier 4b and moving along path $B_P$ and article 12c is traveling on carrier 4c along path $A_P$.

Figure 8:
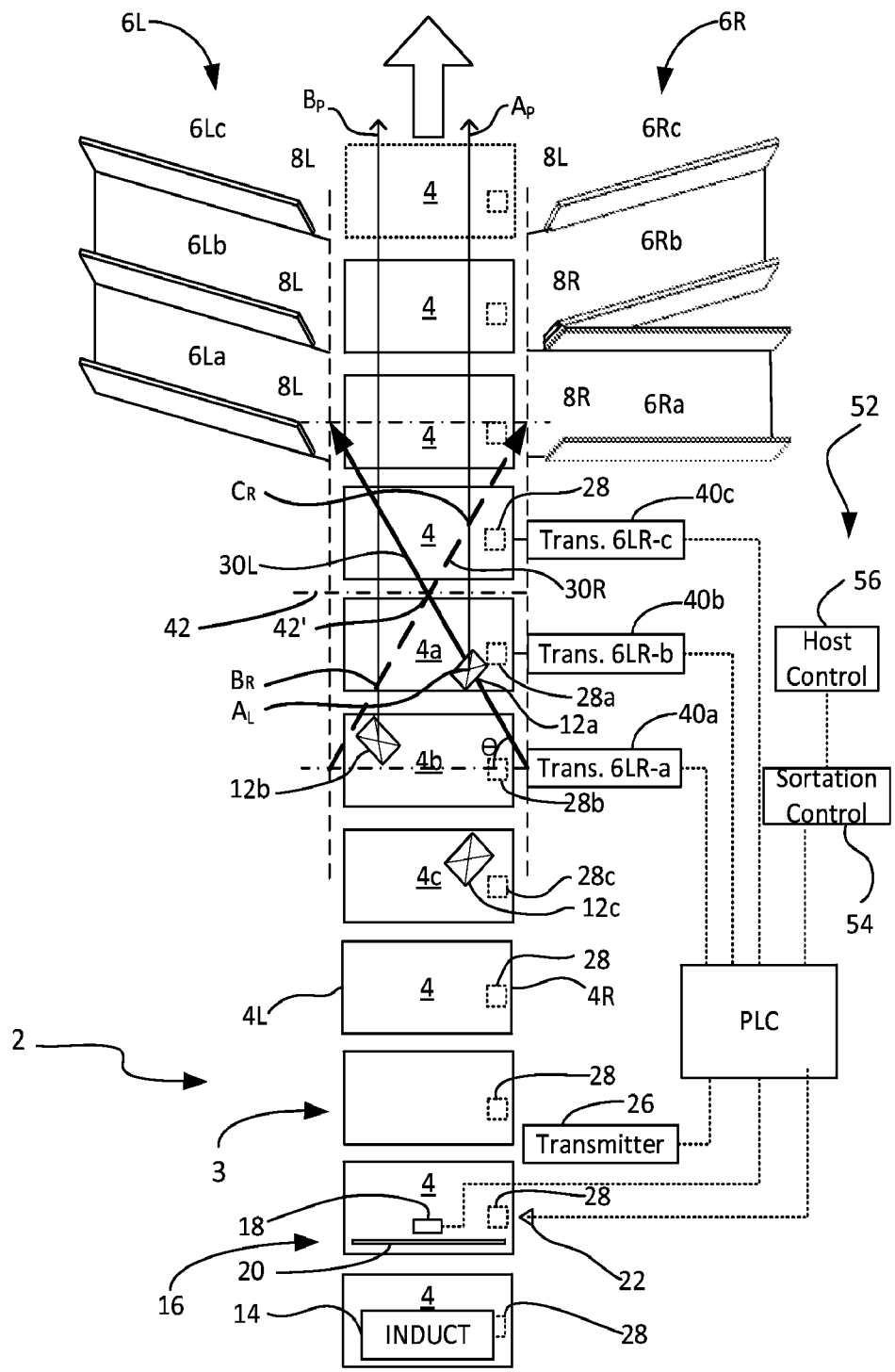
FIG. 8 is a diagrammatic representation of the unit sortation system of FIG. 7 with three articles ready for discharge from three carriers

In FIG. 8 article 12a has moved downstream along path $A_P$ to reach point $A_L$ on discharge trajectory 30L and the leftward discharge of article 12a is starting. Article 12b is to be discharged right, and carrier 4b will not be actuated until article 12b reaches the intersection $B_R$ of path $B_P$ with discharge trajectory 30R (intercepts trajectory 30R). For article 12c, this is accomplished by applying the article discharge compensation $DB_X$ and $DB_Y$ relative to the reference discharge compensation $D_R$. Point 42' on line 42 represents the location of articles 12a-12c after a period of time equal to the reference discharge compensation $D_R$ has passed. Point $B_R$ is before this point and article 12b will fall on point 42' when article 12b reaches line 42. The total discharge compensation for article 12b is determined by subtracting the Y direction discharge compensation $DB_Y$ and adding the X direction discharge compensation $DB_X$ to the reference discharge compensation $D_R$. Once a period of time representative of the total discharge compensation has passed, article 12b will be at point $B_R$ and carrier 4b will be actuated. Article 12c continues traveling on carrier 4c along path $A_P$.

Figure 9:
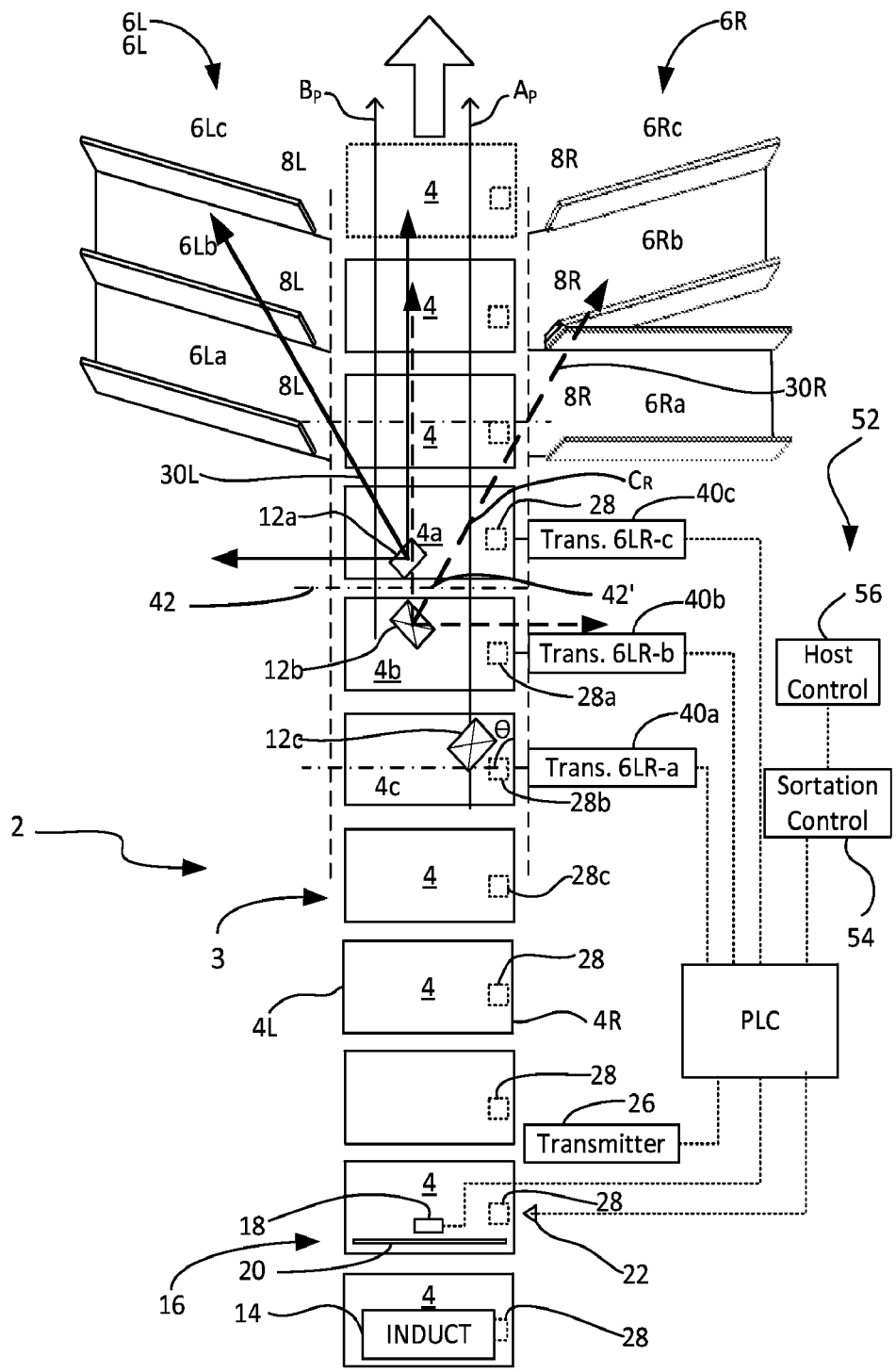
FIG. 9 is a diagrammatic representation of the unit sortation system of FIG. 8 with three articles on three carriers moving towards discharge.

In FIG. 9, article 12a continues to move to the left along discharge path 30L on carrier 4a article 12b has passed intersection $B_R$ of path $B_P$ with discharge trajectory 30R and is moving along discharge trajectory 30R. Article 12c has moved downstream along path $A_P$ to reach point $A_L$ on discharge trajectory 30L and carrier discharge control 28a of carrier 4a is in line with transmitter 40a. Carrier discharge control 28a has received a "discharge right" command from transmitter 40a to discharge article 12c along trajectory 30R. Article 12c is to be discharged right, and carrier 4c will not be actuated until article 12c reaches the intersection $C_R$ of path $A_P$ with discharge trajectory 30R (intercepts trajectory 30R). For article 12c, this is accomplished by applying the article discharge compensation $DC_X$ and $DC_Y$ relative to the reference discharge compensation $D_R$. Point 42' on line 42 represents the location of articles 12a-12c after a period of time equal to the reference discharge compensation $D_R$ has passed. An additional period of time must pass until article 12c reaches point $C_R$ before carrier 4c can be actuated. The total discharge compensation for article 12c is determined by subtracting the Y direction discharge compensation $DC_Y$ and adding the X direction discharge compensation $DC_X$ to the reference discharge compensation $D_R$. Once a period of time representative of the total discharge compensation has passed, article 12c will be at point $C_R$ and carrier 4c will be actuated.

Figure 10:
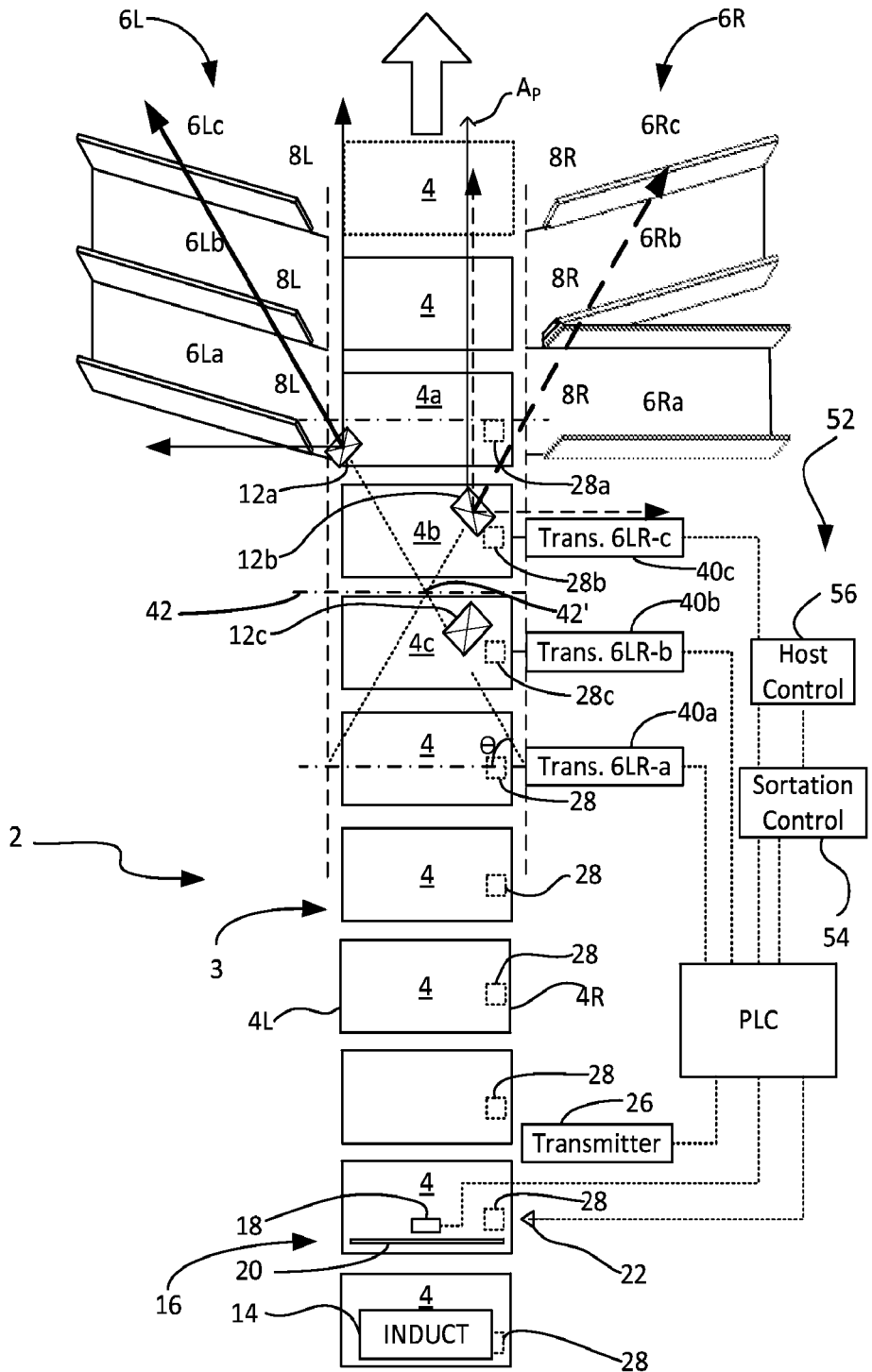
FIG. 10 is a diagrammatic representation of the unit sortation system of FIG. 9 with three articles on three carriers moving farther towards discharge.

In FIG. 10, article 12a continues to move to the left along discharge path 30L and is partially discharged from carrier 4a. Article 12b continues to be carried on carrier 4b and is moving to the right along discharge trajectory or path 30L. Article 12c continues to follow path $A_P$ while being carried on carrier 4c.

Figure 11:
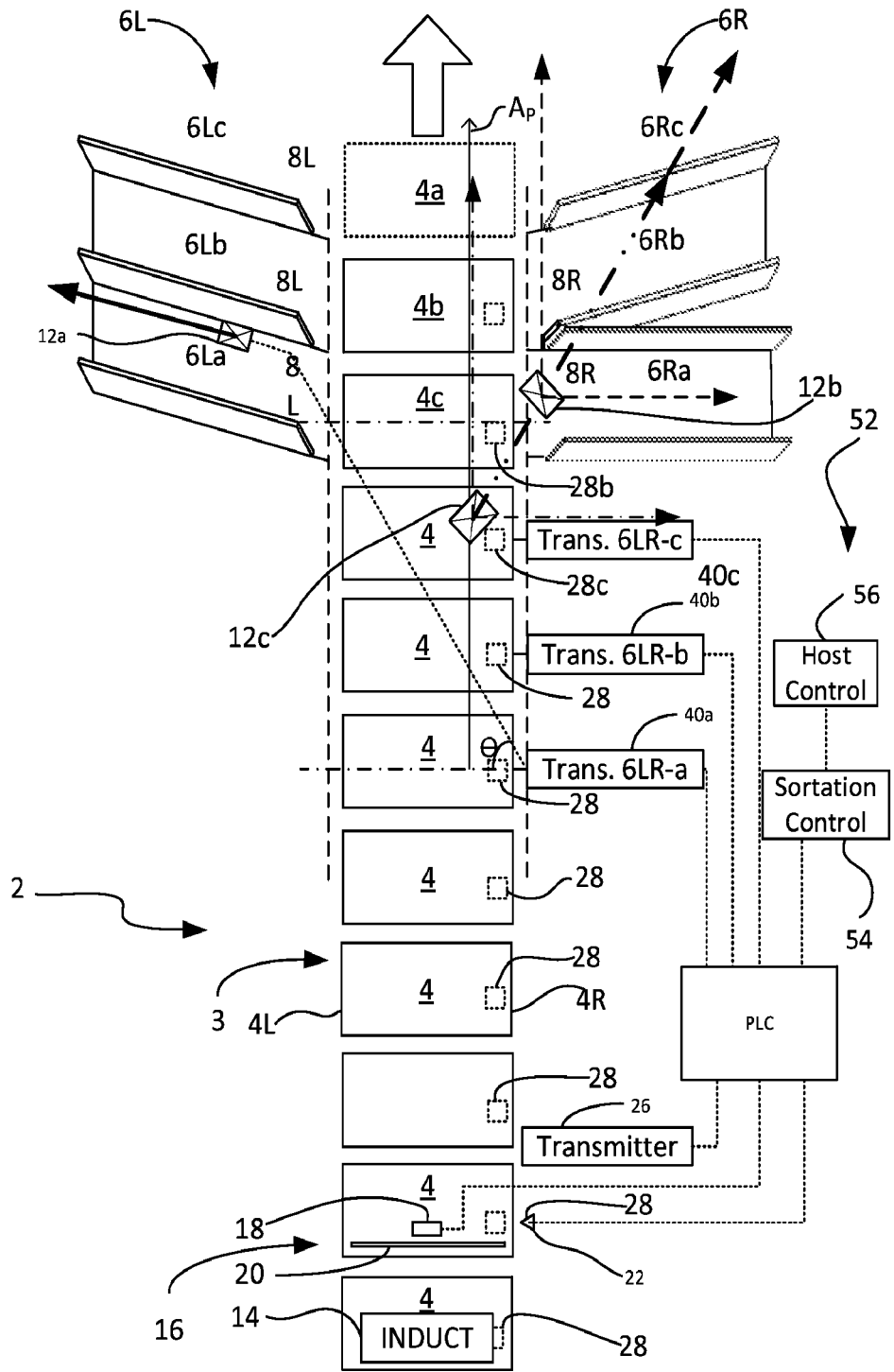
FIG. 11 is a diagrammatic representation of the unit sortation system of FIG. 10 showing three articles with two articles discharged and one moving towards discharge.

In FIG. 11, article 12a is discharged from carrier 4a, has successfully been placed into discharge location 6La and is moving to the left therein. Article 12b is discharged from carrier 4b and is following discharge trajectory 30R as it moves into entrance 8L of discharge location 6Ra. Article 12c is being discharged to the right towards discharge location 6Ra as article 12c has passed the intersection $C_R$ of path $A_P$ with discharge trajectory 30R (intercepts trajectory 30R). Article 12c will continue to follow a short path 30R to discharge into discharge location 6Ra.

Carrier Motion Profiles

Figure 6:
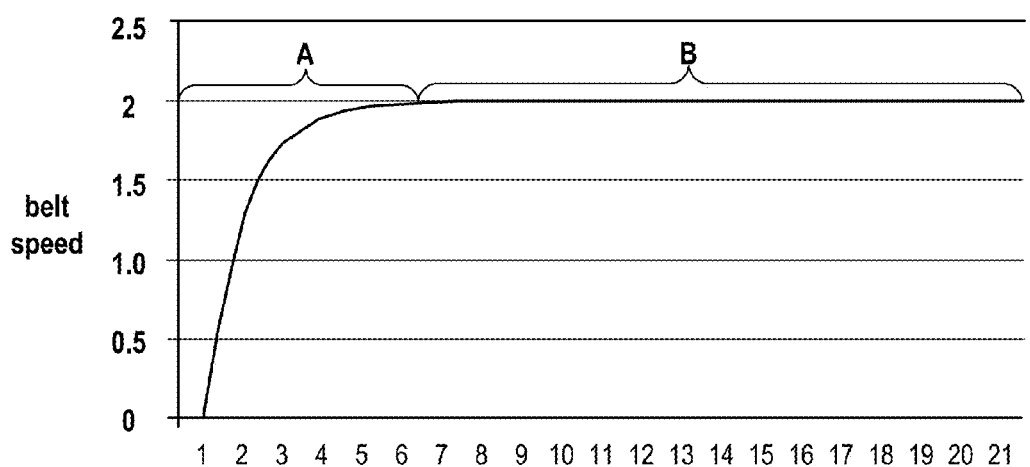
FIG. 6 is a diagrammatic representation of the unit sortation system of FIG. 2 with three articles ready for discharge from three carriers.

Carriers 4 have carrier motion profiles based on the carriers' movement upon being actuated. For example, a crossbelt carrier, such as in the embodiment depicted, may have a carrier motion profile as seen in FIG. 6, which illustrated the ramping up of the crossbelt from zero to full speed, resulting from the fact that the speed of the motor does not instantaneously reach its maximum discharge speed. Additionally, the carrier motion profile of the crossbelt may also be regulated in order to provide for efficient transfer of energy to the article so that the article will reach and travel along the desired discharge trajectory without rolling, skidding or shifting. A tilt tray will also have a carrier motion profile as the tilting is actuated and the tray moves to its full tilt position.

Articles have article initial motion profiles, which is the article motion from the start of actuation of the carrier (portion A) until the moment the article reaches its steady state velocity (portion B) (relative to the carrier), resulting from the carriers' motion profile. Although the articles' physical attributes may also affect the motion of the article during actuation, a single article initial motion profile may be considered as being applicable to all articles or a group of articles, or respective article initial motion profiles may have determined or designated for respective articles. Since, upon actuation of the carrier, the article does not reach the full speed of discharge instantaneously (e.g., ramping up the crossbelt to full speed or the article reaching full discharge speed on a tray as tilting goes from nominal to maximum), actuation of the carrier may be advanced ahead of (begin in less time than) the total discharge compensation, timed so that the article motion profile matches the discharge trajectory when the two first coincide. The discharge velocity of the article reference point is reached when the article reference point 109 actually reaches the discharge trajectory, with the article reference point 109 then following the discharge trajectory. As used herein and in the claims, determining when an article's article reference point 109 has reached the discharge trajectory of the discharge location at which that article is to be discharged may include accounting for the article's initial motion profile such that the article reference point 109 is considered to have reached its discharge trajectory at the time or location when discharge actuation has to occur in order for the article, following its article initial motion profile substantially reaches its steady state velocity at the moment the article's article reference point 109 actually reaches the article's discharge trajectory, that is the article motion profile matches the discharge trajectory when the two first coincide.

In the embodiment depicted, the lateral motion of the carrier belt, driven by known brushless DC motor, follows an exponential curve that approximates the curve:

$$\text{CurrentBeltSpeed}(Ts) = \text{MaxBeltSpeed} \times (1 - \exp(-Ts)) \quad (xi)$$

for Ts=0 to infinity.

Complex Reference Frame Example

Figure 12:
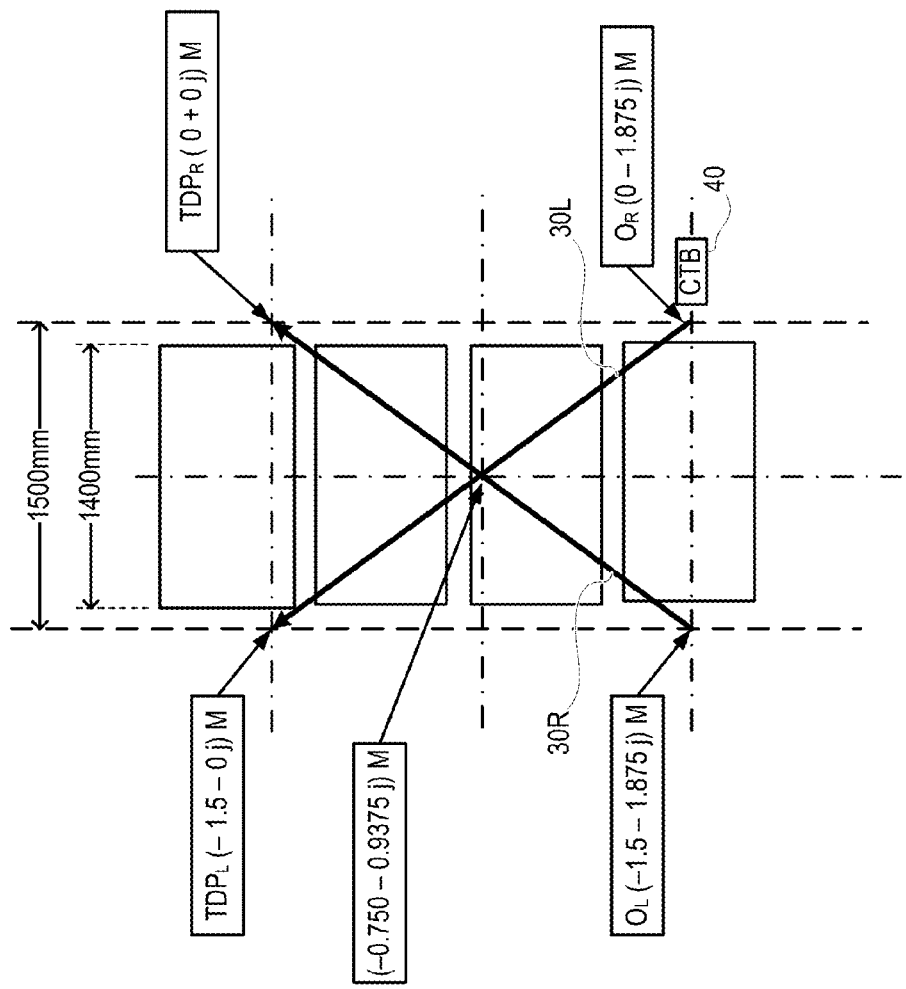
FIG. 12 is similar to FIG. 2 and illustrates discharge trajectories (right and left directions) of another embodiment.

FIG. 12 depicts a specific embodiment, described using a complex reference frame, in which the magnitude of the sorter speed is 2.5 M/s, the magnitude of the carrier speed is 2.0 M/s, the distance between the target discharge points is 1.5M and the width of the carrier is 1.4M, yielding the following formulae:

$$\text{Sorter Speed (SS)} = (0 + 2.5j) \text{ M/s} \quad (xii)$$

$$\text{Crossbelt Speed (CBS)} = (-2.0 + 0j) \text{ M/s (left discharge)} \quad (xiii)$$

$$\text{Crossbelt Speed (CBS)} = (2.0 + 0j) \text{ M/s (right discharge)} \quad (xiv)$$

$$\text{Velocity(right discharge)} = \text{CBS} + \text{SS} = (2.0 + 2.5j) \text{ M/s} \quad (xv)$$

$$|\text{Velocity(discharge)}| = \text{abs}(\text{Velocity(right discharge)}) = 3.2016 \text{ M/s} \quad (xvi)$$

$$\text{Direction of discharge}(\theta) = \arg(\text{Velocity(right discharge)}) = 0.8961 \text{ radian} \quad (xvii)$$

FIG. 6 is a diagrammatic representation of an entire sortation system 2. Oval 44 represents a plurality of carriers (not specifically illustrated in FIG. 6) as described above, arranged in an endless loop in the shape of oval 44. The endless loop of carriers, also known as a carrier train, may be propelled by any suitable means, including for example, by one or more linear synchronous motors. The speed and position of the train are controlled by PLC 24, represented by 46.

The left and right sides of oval 44 are illustrated as being the same. The right side of sortation system 44 will be discussed herein, the discussion being applicable to the left side. Sortation conveyor system 2 includes stray parcel sensor 48, induct 14, item detection system 16, scanner 50, and discharge locations 6L and 6R.

Immediately upstream of induct 14 is stray parcel sensor 48 which functions to detect whether any articles are present on carriers after the carriers have passed upstream discharge locations. Information from stray parcel sensor 48 is used to verify whether an article was actually discharged. If the carrier discharge control 28 indicates that no discharge occurred (such as no command to discharge was received or the carrier did not actuate in response to a received command) or if stray parcel sensor 48 detects an article, an appropriate condition is set in PLC 24.

As discussed above, item detection system 16 localizes locations of respective articles on respective carriers relative to the carrier reference point CR$_P$, and signals these data to PLC 24. PLC 24 executes instructions to perform a function on the data in order to calculate a discharge delay adjustment that includes the X direction discharge delay parameter and the Y direction discharge delay parameter. The discharge delay adjustment is signaled to carrier discharge control 28 through transmitter 26 by PLC 24.

Scanner 50 identifies the articles on carriers and communicates this information to PLC 24. Scanner 50 may be a bar code reader, or any device suitable for identifying the unique articles. PLC 24 communicates the article information to sortation control 54 which assigns a discharge location for each carrier based on the specific article or articles on the carrier. Alternatively, the article information could be passed from sortation control 54 to host control 56 and host control 56 could assign the discharge location. The discharge location is communicated to PLC 24.

PLC 24 is connected to the plurality of transmitters 40 respectively associated with a specific discharge location of the plurality of discharge locations 6L, 6R. When a carrier reaches the transmitter 40 associated with the assigned discharge location for that carrier (based on the article it is carrying), PLC 24 communicates the discharge command, which for a double sided chute bank includes direction of discharge, through transmitter 40 to that carrier's carrier discharge control 28. Carrier discharge control 28 applies the discharge delay adjustment and then actuates discharge.

The functions performed by PLC 24 could be performed by a plurality of PLCs performing one or more of the functions.

Figure 13:
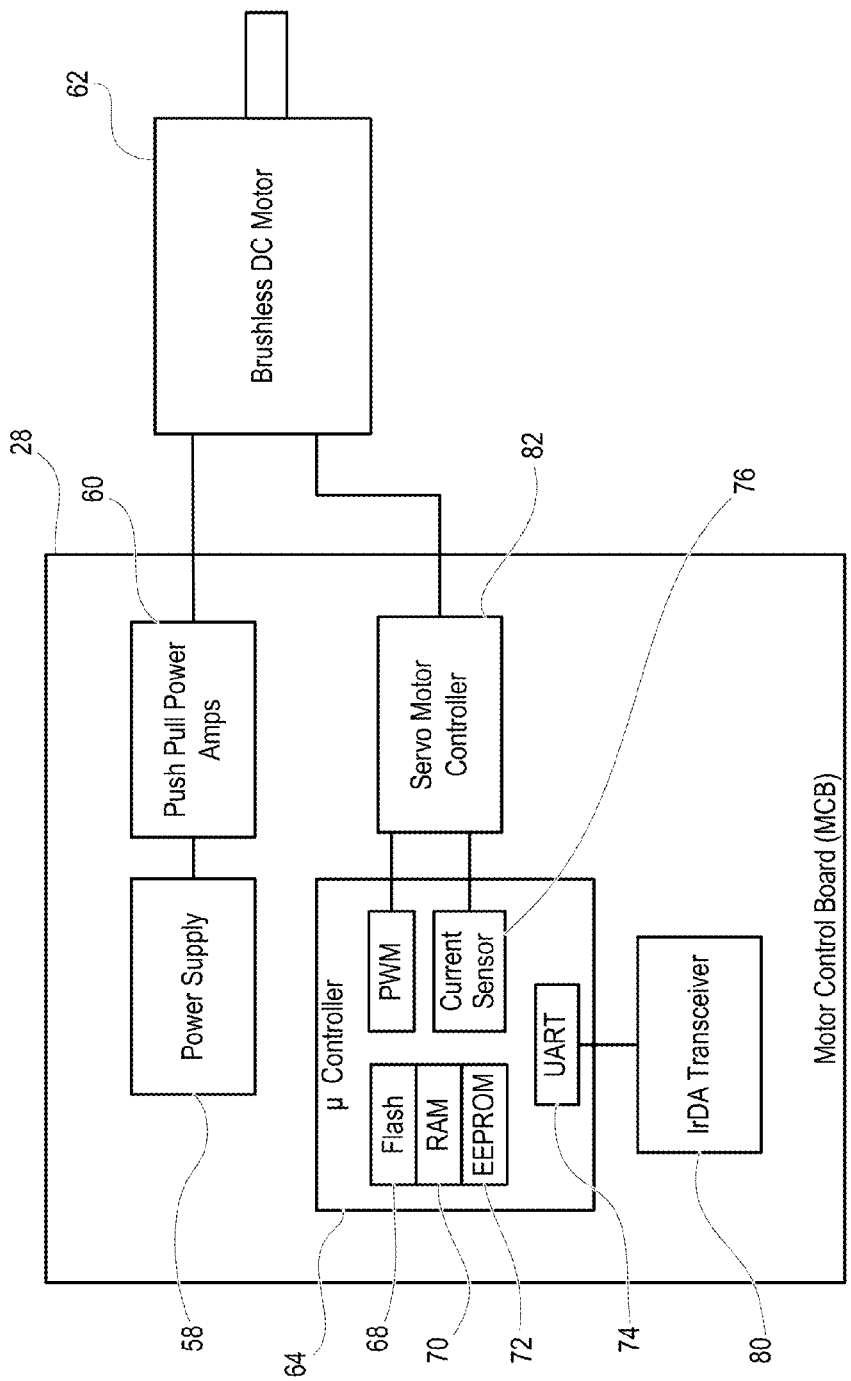
FIG. 13 is a diagrammatic representation of a carrier discharge control board, a specific embodiment of a carrier discharge control.

FIG. 13 diagrammatically illustrates carrier discharge control 28, which may be a carrier discharge control board as indicated. Each carrier 4 has an associated carrier discharge control 28 associated. Carrier discharge control 28 includes power supply 58 which regulates the low voltage power for electronics and pre-amplifies for power amps 60 which power the windings of the carrier's motor 62. In the embodiment depicted, motor 62 is a brushless DC motor. This embodiment of carrier discharge control 28 includes microcontroller 64 which comprises a central processing unit, flash memory 68, static RAM memory 70, EEPROM 72, universal asynchronous receive/transmitter block 74, position sense block and current sense block 76 and pulse width modulator 78. Carrier discharge control 28 also includes infra-red receiver/transmitter opto-electronics 80 and servo carrier discharge control 82, which commutates power amps 60 sequentially to cause motor 62 to rotate in the desired angular direction and speed.

Figure 14:
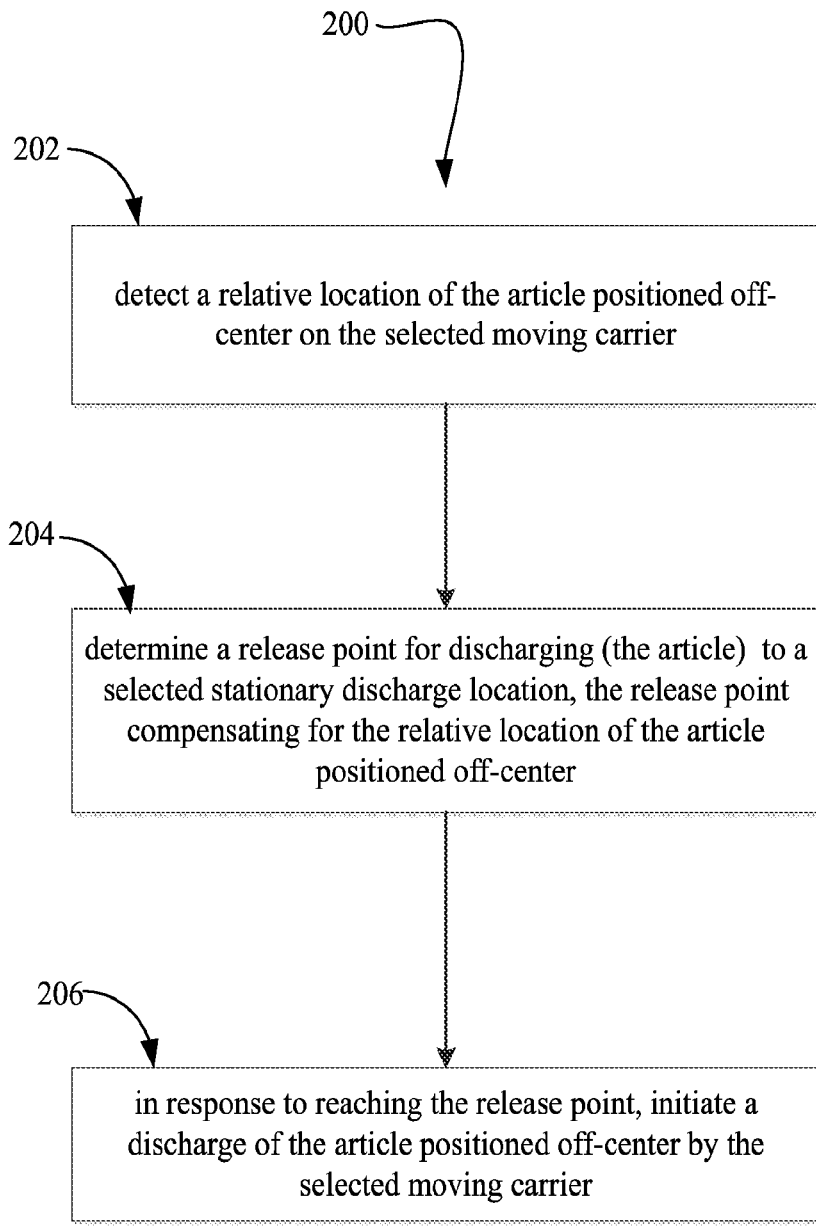
FIG. 14 is a process flow diagram illustrating an embodiment method for compensating a discharge from a sortation system of an article positioned off-center on a carrier.

FIG. 14 illustrates an embodiment method 200 for discharging an article from a sortation system when the article is positioned off-center on a selected moving carrier of the sortation system. In the embodiment, the method for discharging an article from the sortation may be performed by the sortation system depicted in at least FIGS. 1-2 by a processor of a controller such as processing system 52 described above. In Block 202, the method includes detect a relative location of the article positioned off-center on the selected moving carrier. The relative location of an article positioned off-center on a selected carrier may be detected by an item detection system that is linked to the processing system. In this manner, the location of the article relative to the carrier can be determined as off-center values.

In Block 204, the processing system 52 can determine a release point for discharging (the article) to a selected stationary discharge location, the release point compensating for the relative location of the article positioned off-center. The processing system 52 may use the off-center detection values to determine discharge compensation that can alter the release point to ensure the article is discharged from the moving carrier and into the selected stationary discharge location. In this manner, the processing system can determine the release point for discharging the article 12 into a selected stationary discharge location 6L, 6R where the determined release point compensates for the relative location of the article to the carrier 4.

In Block 206, in response to reaching the release point, initiate a discharge of the article positioned off-center by the selected moving carrier. In this manner, the processing system may release the article at the release point where the release point includes compensation for the off-center location of the article on the carrier, and place the article into the selected stationary discharge location.

Figure 15:
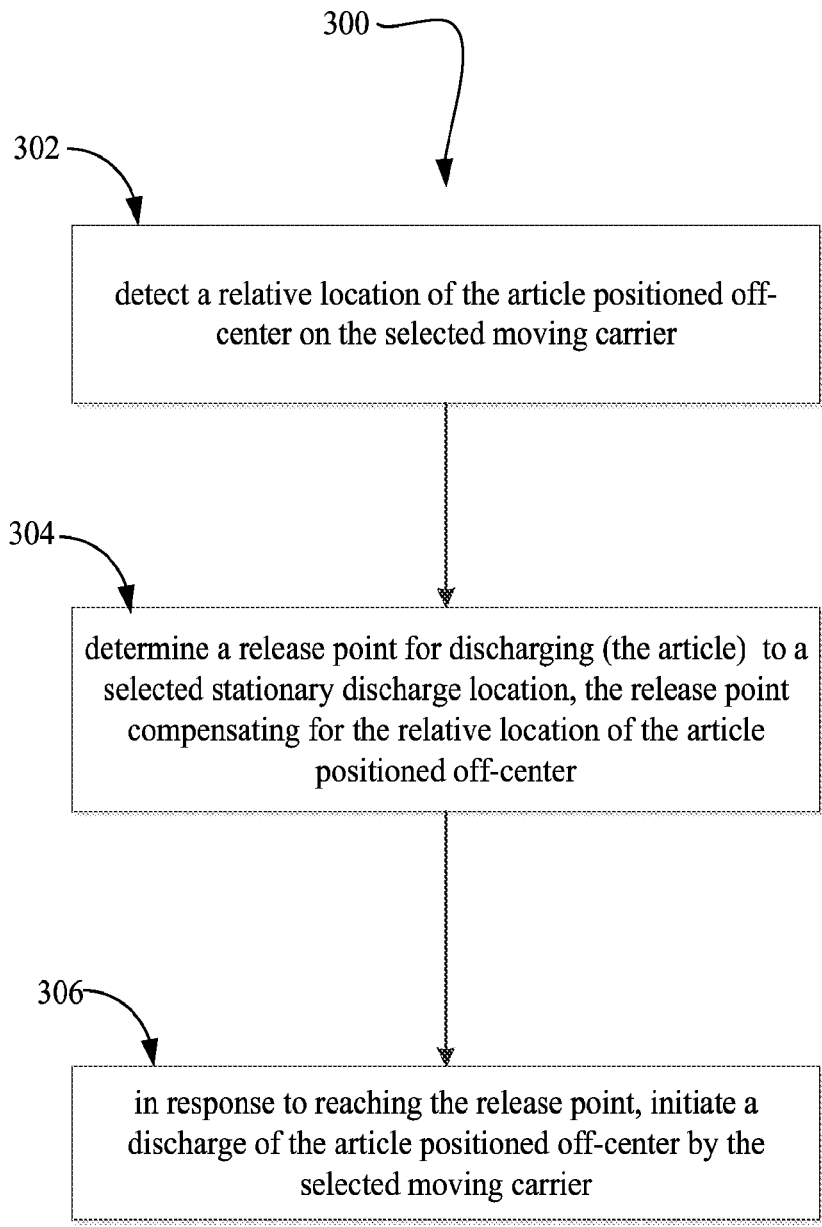
FIG. 15 is a process flow diagram for a machine element embodiment for compensating a discharge from a sortation system of an article positioned off-center on a carrier.

FIG. 15 illustrates a machine element embodiment 300 where a material handling system has an endless conveyor having more than one moving carrier that moves past more than one stationary discharge location, and an image device positioned to detect an article positioned off-center on a selected moving carrier. A controller is provided and in communication with the endless conveyor and the image device, to perform operations as follows. In the embodiment, the controller may be the processing system 52 described above and depicted in at least FIGS. 1-2. In Block 302, the material handling system may detect a relative location of the article positioned off-center on a selected carrier of the endless conveyor. The relative location of an article positioned off-center on a selected carrier may be detected by an item detection system that is linked to the processing system. In this manner, the location of the article relative to the carrier can be determined as off-center values.

In Block 304, the processing system 52 can determine a release point for discharging the article to a selected stationary discharge location where the determined release point compensates for the relative location of the article to the carrier. The release point may be determined by the processing system 52 which may use the off-center detection values to determine discharge compensation that can alter the release point to ensure the article is discharged from the moving carrier and into the selected stationary discharge location. In this manner, the processing system can determine the release point for discharging the article 12 into a selected stationary discharge location 6L, 6R where the determined release point compensates for the relative location of the article to the carrier 4.

In Block 306, in response to reaching the release point, the processing system can initiate the discharge of the article by the selected carrier. In this manner, the processing system may release the article at the release point where the release point includes compensation for the off-center location of the article on the carrier, and place the article into the selected stationary discharge location.

Figure 16:
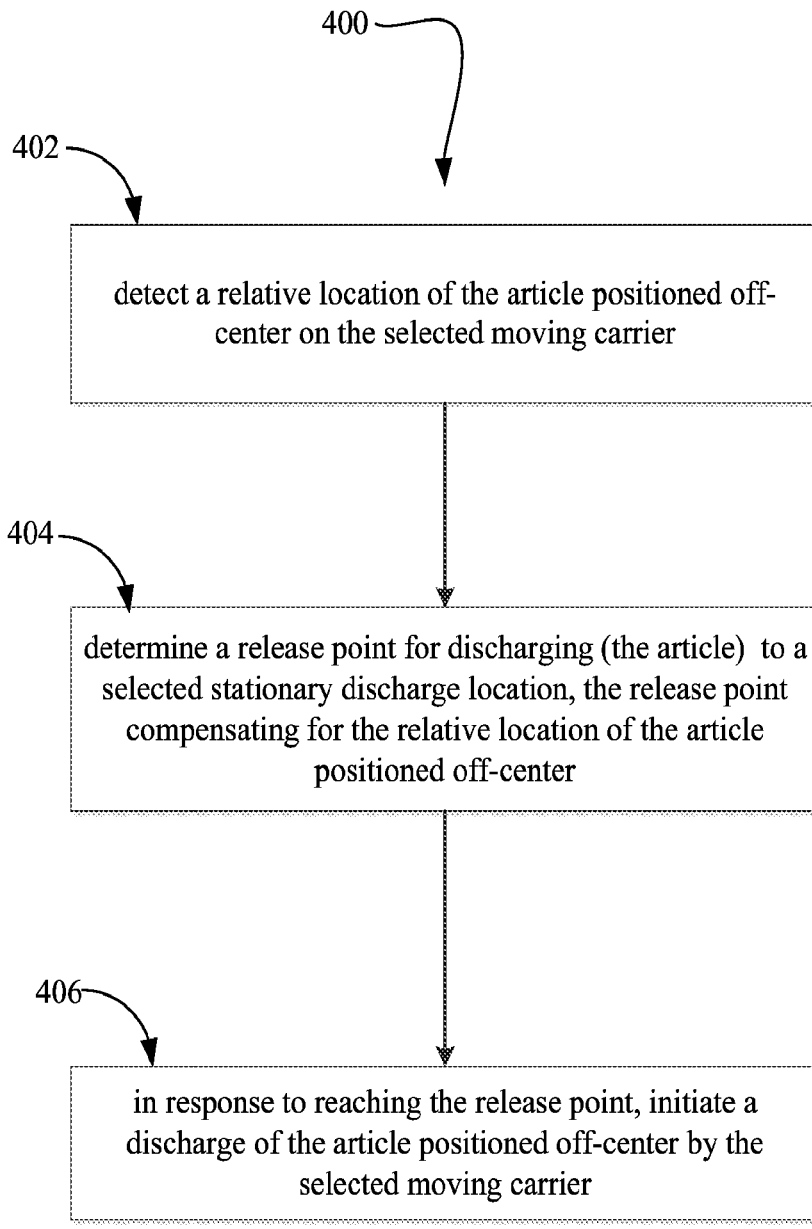
FIG. 16 is a process flow diagram for a controller embodiment for compensating a discharge from a sortation system of an article positioned off-center on a carrier.

FIG. 16 illustrates a controller embodiment 400 where a controller has an interface to an endless conveyor, at least one processor, and a memory. In the embodiment, the controller, the processor and the memory may be the processing system 52 described above and depicted in at least FIGS. 1-2. The at least one processor is coupled to the memory and the interface and configured with processor-executable instructions to perform operations as follows. In Block 402, the material handling system may detect a relative location of the article positioned off-center on a selected carrier of the endless conveyor. The relative location of an article positioned off-center on a selected carrier may be detected by an item detection system that is linked to the processing system. In this manner, the location of the article relative to the carrier can be determined as off-center values.

In Block 404, the processing system 52 can determine a release point for discharging the article to a selected stationary discharge location where the determined release point compensates for the relative location of the article to the carrier. The release point may be determined by the processing system 52 which may use the off-center detection values to determine discharge compensation that can alter the release point to ensure the article is discharged from the moving carrier and into the selected stationary discharge location. In this manner, the processing system can determine the release point for discharging the article 12 into a selected stationary discharge location 6L, 6R where the determined release point compensates for the relative location of the article to the carrier 4.

In Block 406, in response to reaching the release point, the processing system can initiate the discharge of the article by the selected carrier. In this manner, the processing system may release the article at the release point where the release point includes compensation for the off-center location of the article on the carrier, and place the article into the selected stationary discharge location.

Explicit Definitions

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the innovation to the precise form disclosed. Obvious modifications or variations are possible in light of the above teachings. The embodiment was chosen and described in order to illustrate the principles of the innovation and its application to thereby enable one of ordinary skill in the art to utilize the innovation in various embodiments and with various modifications as are suited to the particular use contemplated. Although only a limited number of embodiments of the invention is explained in detail, it is to be understood that the innovation is not limited in its scope to the details of construction and arrangement of components set forth in the preceding description or illustrated in the drawings. The innovation is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the innovation be defined by the claims submitted herewith.

The invention claimed is:

1. A material handling system comprising:
   a sortation system;
   an image device for detecting an image of an article at an off-center location on a selected moving carrier of the sortation system;
   a controller in communication with the image device and the sortation system to perform operations to:
      determine the off-center location by performing image processing of the image;
      determine a change to a discharge command that compensates for the off-center location to discharge the article to a selected stationary discharge location; and
      execute the changed discharge command to discharge the article at the selected stationary discharge location.

2. The material handling system of claim 1, wherein:
   the sortation system comprises an endless conveyor having more than one moving carrier that moves past more than one stationary discharge location;
   the controller performs operations to:
      determine the change to the discharge command by determining a release point for discharging to the selected stationary discharge location; and
      determine whether the release point has been reached; and
      in response to determining that the release point has been reached, executing the changed discharge command by initiating discharge of the article positioned off-center by the selected moving carrier.

3. The material handling system of claim 1, wherein the off-center location comprises a longitudinal component.

4. The material handling system of claim 1, wherein the off-center location comprises a lateral component.

5. The material handling system of claim 1, wherein the controller determines the change to the discharge command that compensates for the off-center location to discharge the article to the selected stationary discharge location by:
   determining a longitudinal speed of the sortation system; and
   determining the change in the discharge command to compensate at least in part for the longitudinal speed of the sortation system.

6. The material handling system of claim 5, wherein:
   the carrier comprises a cross belt carrier; and
   the controller determines the change to the discharge command that compensates at least in part for the off-center location to discharge the article to the selected stationary discharge location by:
      determining a motor profile of cross belt carrier; and
      determining the change in the discharge command to compensate at least in part for the motor profile of the cross belt carrier of the sortation system to effect discharge of the article from the off-center location.

7. The material handling system of claim 1, wherein determining the change to the discharge command comprises determining an amount of time required to actuate the selected mobile carrier to discharge the article to the selected stationary discharge location.

8. The material handling system of claim 1, wherein determining the change to the discharge command comprises determining a release location of the selected mobile carrier required to actuate the selected mobile carrier to discharge the article to the selected stationary discharge location.

9. A controller of a material handling system, the controller comprising:
   an interface in communication with a sortation system; and
   a processor in communication with an image device positioned to image articles on carriers of a sortation system and the interface and comprising a processor to perform operations to:
      determine an off-center location of an article on a selected carrier of the sortation system by performing image processing of the image;
      determine a change to a discharge command that compensates for the off-center location to discharge the article to a selected stationary discharge location; and
      execute the changed discharge command to discharge the article at the selected stationary discharge location.

10. The controller of claim 9, wherein:
   the sortation system comprises an endless conveyor having more than one moving carrier that moves past more than one stationary discharge location;
   the controller performs the operations to:
      determine the change to the discharge command by determining a release point for discharging to the selected stationary discharge location;
      determine whether the release point has been reached; and
      in response to determining that the release point has been reached, executing the changed discharge command by initiating discharge of the article positioned off-center by the selected moving carrier.

11. The controller of claim 9, wherein the off-center location comprises a longitudinal component.

12. The controller of claim 9, wherein the off-center location comprises a lateral component.

13. The controller of claim 9, wherein the controller determines the change to the discharge command that compensates for the off-center location to discharge the article to the selected stationary discharge location by:
   determining a longitudinal speed of the sortation system; and
   determining the change in the discharge command to compensate at least in part for the longitudinal speed of the sortation system.

14. The controller of claim 13, wherein:
   the carrier comprises a cross belt carrier; and
   the controller determines the change to the discharge command that compensates at least in part for the off-center location to discharge the article to the selected stationary discharge location by:
      determining a motor profile of cross belt carrier; and
      determining the change in the discharge command to compensate at least in part for the motor profile of the cross belt carrier of the sortation system to effect discharge of the article from the off-center location.

15. The controller of claim 9, wherein determining the change to the discharge command comprises determining an amount of time required to actuate the selected mobile carrier to discharge the article to the selected stationary discharge location.

16. The controller of claim 9, wherein determining the change to the discharge command comprises determining a release location of the selected mobile carrier required to actuate the selected mobile carrier to discharge the article to the selected stationary discharge location.

17. A method of controlling a material handling system, the method comprising:
   imaging by an image device an article on a selected carrier of a sortation system;
   determining an off-center location of the article on the selected carrier of the sortation system by performing image processing of the image;
   determining a change to a discharge command that compensates for the off-center location to discharge the article to a selected stationary discharge location; and
   executing the changed discharge command to discharge the article at the selected stationary discharge location.

18. The controller of claim 17, wherein:
   the sortation system comprises an endless conveyor having more than one moving carrier that moves past more than one stationary discharge location;
   determining the change to the discharge command comprises determining a release point for discharging to the selected stationary discharge location and determining whether the release point has been reached; and
   in response to determining that the release point has been reached, executing the changed discharge command by initiating discharge of the article positioned off-center by the selected moving carrier.

19. The method of claim 17, wherein the off-center location comprises a longitudinal component.

20. The method of claim 17, wherein the off-center location comprises a lateral component.

21. The method of claim 17, wherein determining the change to the discharge command that compensates for the off-center location to discharge the article to the selected stationary discharge location further comprises:
   determining a longitudinal speed of the sortation system; and
   determining the change in the discharge command to compensate at least in part for the longitudinal speed of the sortation system.

22. The method of claim 21, wherein:
the carrier comprises a cross belt carrier; and
determining the change to the discharge command that compensates at least in part for the off-center location to discharge the article to the selected stationary discharge location further comprises:
determining a motor profile of cross belt carrier; and
determining the change in the discharge command to compensate at least in part for the motor profile of the cross belt carrier of the sortation system to effect discharge of the article from the off-center location.

23. The method of claim 17, wherein determining the change to the discharge command comprises determining an amount of time required to actuate the selected mobile carrier to discharge the article to the selected stationary discharge location.

24. The method of claim 17, wherein determining the change to the discharge command comprises determining a release location of the selected mobile carrier required to actuate the selected mobile carrier to discharge the article to the selected stationary discharge location.

* * * * *